Oct. 28, 1924.
O. W. HOWARD
PLOW
Original Filed Feb. 13, 1922
1,513,245
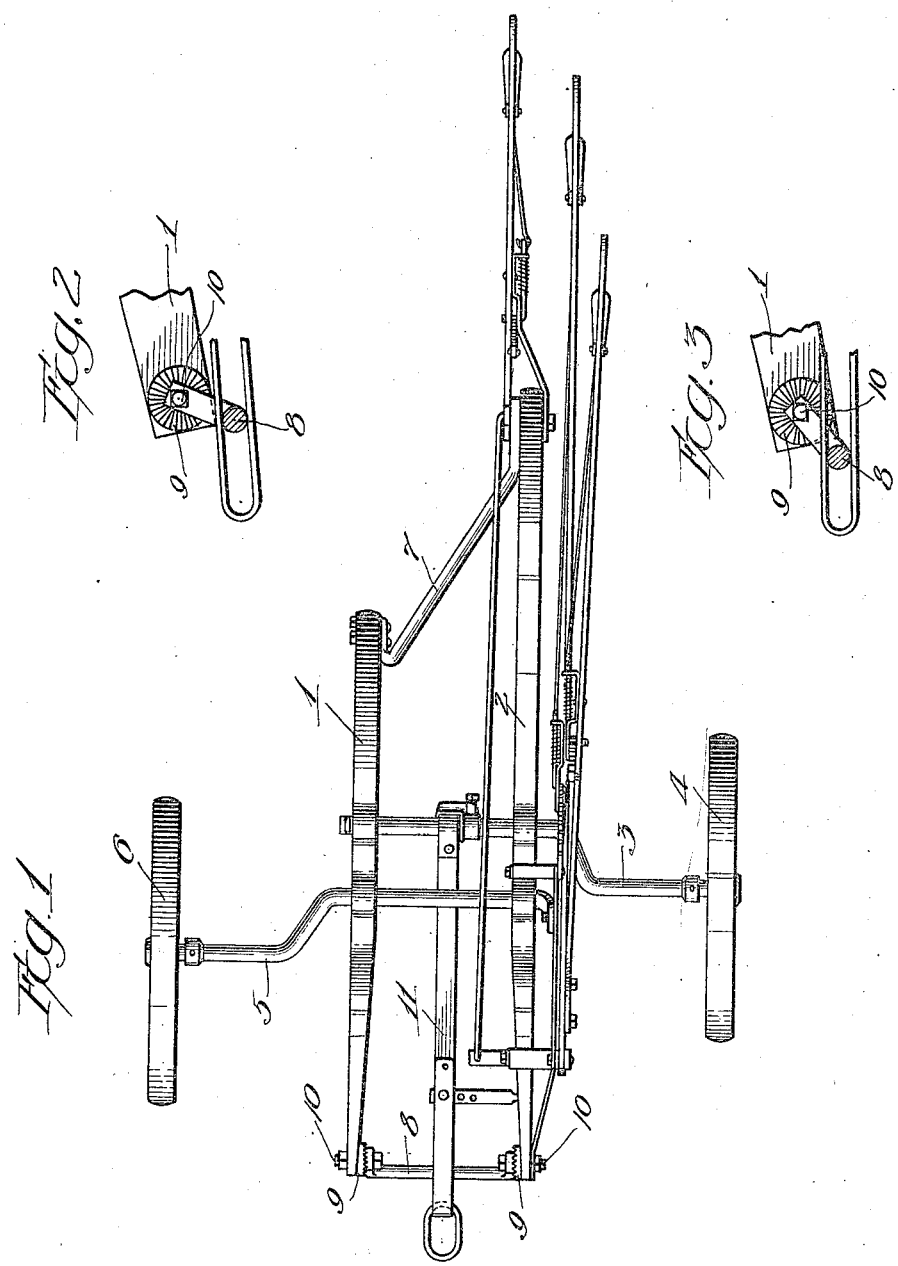
Inventor:
Otis W. Howard
L. C. Shorts Atty Patented Oct. 28, 1924.

1,513,245

UNITED STATES PATENT OFFICE.

OTIS W. HOWARD, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

PLOW.

Application filed February 13, 1922, Serial No. 536,032. Renewed September 6, 1924.

*To all whom it may concern:*

Be it known that I, OTIS W. HOWARD, a citizen of the United States, residing at 2622 17th Ave., Moline, county of Rock Island, State of Illinois, have invented certain new and useful Improvements in Plows, of which the following is a specification.

The invention relates to plows.

The general object is to provide a simplified plow construction.

A more specific object is to provide a plow in which a part of the framework is utilized for adjusting the height of the draft.

Other objects and advantages of the invention will appear from the specification and drawings.

An embodiment of the invention is illustrated in the accompanying drawings in which, Figure 1 is a plan view showing the invention applied to a plow.

Figure 2 is a side elevation of a portion of the framework and the draft member.

Figure 3 is a view similar to Figure 2 with the parts in a different position.

The plow comprises, in general, a pair of plow beams 1 and 2 supported by a landwheel crank axle 3 carrying a landwheel 4 and a furrow-wheel crank axle 5 carrying a furrow-wheel 6.

The plow beams 1 and 2 are connected together by means of a rear brace 7 and a front brace 8. This combination forms a rigid framework to which the crank axles are pivoted so that they may swing to raise and lower the plows.

The front brace 8 is preferably U-shaped and the arms of the U are provided with serrations which engage serrated washers 9 bearing against the plow beams, the brace being fastened to the beams by means of bolts or other fastening devices 10. When the bolts 10 are tightened, the brace 8 is held rigidly in position and it serves to unite the front ends of the plow beams. By loosening the bolts 10, the base of the U-shaped brace may be swung to various positions so that its height may be changed. It will remain in these positions when the bolts are tightened by reason of the fact that its serrated or rougened surface will engage the serrated washers.

Connected to the plow is a draft device 11 made of strap iron, the front end of which is bent back upon itself and hooked over the base of the U-shaped brace 8 so that any movements of that brace are transmitted to the draft member. It is necessary, in plows, to change the height of draft under varying conditions of plowing and it will be observed from a consideration of the above construction that such change may be readily made by simply shifting the position of the brace 8. The degree of adjustment may be varied to anywhere between the bottom position of the base of the brace and its top position. The range of adjustment in plows of various kinds may be varied by varying the length of the arms of the U-shaped brace that is used.

This construction eliminates the necessity of providing special adjusting mechanism for varying the height of draft. It utilizes one of the necessary parts of the plow framework, namely the brace, for securing the adjustment and it does this without destroying the function of the brace.

It is to be understood that variations may be made in the exact construction without departing from the spirit and scope of the appended claims.

I claim:

1. A plow having plow beams carrying plow bodies, crank axles and ground wheels for supporting the beams, an adjustable brace between the forward ends of the beams, and a draft device connected to one of the crank axles and associated with the brace so that the height of the draft device is varied when the brace is adjusted.

2. A plow having plow beams carrying plow bodies, crank axles and ground wheels for supporting the beams, an adjustable brace between the forward ends of the beams, and a draft bar connected to one of the crank axles and surrounding the brace so that, when the brace is adjusted, the height of the draft bar is varied.

3. A plow having a framework, a draft device, a U-shaped brace having its arms pivotally and adjustably connected to the framework near the forward end thereof so that the brace may be swung on its pivots to vary the height of the base of the U, and a draft device connected to the framework and associated with the brace so that the height of the draft device is varied when the brace is adjusted.

4. A plow having plow beams carrying plow bodies, a U-shaped brace having its arms pivoted to the plow beams near the forward ends thereof so that the brace may be swung on its pivots to vary the height of the base of the U, and a draft member associated with the brace so that, when the brace is adjusted, the height of the draft member is varied.

5. A plow having plow beams carrying plow bodies, crank axles and ground wheels for supporting the beams, a U-shaped brace having its arms pivotally and adjustably connected to the beams near the forward ends thereof so that the brace may be swung on its pivots to vary the position of the base of the U, and a draft member connected to one of the crank axles and associated with the brace so that, when the brace is adjusted, the height of the draft member is varied.

6. A plow having plow beams carrying plow bodies, crank axles and ground wheels for supporting the beams, an adjustable brace connecting the forward ends of the beams, and a draft member comprising a metal strap looped around one of the crank axles and looped around the brace so that, when the brace is adjusted, the height of the draft member is varied.

In testimony whereof, I affix my signature.

OTIS W. HOWARD.